(12) United States Patent
Dani et al.

(10) Patent No.: US 11,045,751 B2
(45) Date of Patent: Jun. 29, 2021

(54) FILTER DESIGN WITH INTERCHANGEABLE CORE COVER

(71) Applicant: Brita LP, Oakland, CA (US)

(72) Inventors: Nikhil P. Dani, Pleasanton, CA (US);
Russell Bell, Pleasanton, CA (US)

(73) Assignee: Brita LP, Oakland, CA (US)

( * ) Notice: Subject to any disclaimer, the term of this patent is extended or adjusted under 35 U.S.C. 154(b) by 15 days.

(21) Appl. No.: 16/550,541

(22) Filed: Aug. 26, 2019

(65) Prior Publication Data

US 2019/0374880 A1 Dec. 12, 2019

Related U.S. Application Data

(63) Continuation of application No. 15/756,768, filed as application No. PCT/IB2016/001479 on Sep. 27, 2016, now Pat. No. 10,391,427.

(60) Provisional application No. 62/235,304, filed on Sep. 30, 2015.

(51) Int. Cl.
*B01D 27/08* (2006.01)
*B01D 29/21* (2006.01)
*B01D 29/96* (2006.01)

(52) U.S. Cl.
CPC .......... *B01D 27/08* (2013.01); *B01D 29/216* (2013.01); *B01D 29/96* (2013.01); *B01D 2201/0415* (2013.01); *B01D 2201/29* (2013.01); *B01D 2201/291* (2013.01); *B01D 2201/52* (2013.01)

(58) Field of Classification Search
None
See application file for complete search history.

(56) References Cited

U.S. PATENT DOCUMENTS

| | | | |
|---|---|---|---|
| 313,320 | A | 3/1885 | Goodale |
| 619,569 | A | 2/1899 | Hewel |
| 1,074,168 | A | 9/1913 | A Feinstein |
| 2,689,048 | A | 9/1954 | Powers |
| 3,016,984 | A | 1/1962 | Getzin |
| 3,497,069 | A | 2/1970 | Lindenthal et al. |
| 3,535,852 | A | 10/1970 | Hirs |
| 3,554,377 | A | 1/1971 | Miller |

(Continued)

FOREIGN PATENT DOCUMENTS

| | | |
|---|---|---|
| CA | 2051056 A1 | 3/1992 |
| CA | 2559637 A1 | 3/2007 |

(Continued)

OTHER PUBLICATIONS

Activated Carbon Fiber & Activated Carbon Felt by HP Materials Solutions, Inc. (Possible NPL) No publication date available.

(Continued)

*Primary Examiner* — Chester T Barry
(74) *Attorney, Agent, or Firm* — Thomas C. Feix

(57) ABSTRACT

In one example, a core cover includes an inner wall that defines a fluid passageway configured to communicate with an interior of a filter core when the core cover is engaged with the filter core. As well, the core cover includes an outer wall spaced apart from the inner wall, and a complementary structure located on the outer wall and configured to engage a corresponding complementary structure of a filter core. Finally, the core cover includes one or more indicia that indicate a flow rate, or range of flow rates, associated with the core cover.

6 Claims, 8 Drawing Sheets

(56) References Cited

U.S. PATENT DOCUMENTS

| | | | |
|---|---|---|---|
| 3,662,780 A | 5/1972 | Marsh | |
| 4,066,551 A | 1/1978 | Stern | |
| 4,096,742 A | 6/1978 | Musolf et al. | |
| 4,121,727 A * | 10/1978 | Robbins | B65D 50/06 215/206 |
| 4,154,688 A | 5/1979 | Pall | |
| 4,259,096 A | 3/1981 | Nakamura et al. | |
| 4,605,499 A | 8/1986 | Wise | |
| 4,696,742 A | 9/1987 | Shimazaki | |
| 4,764,274 A | 8/1988 | Miller | |
| 4,921,600 A | 5/1990 | Meissner | |
| 4,948,499 A | 8/1990 | Peranio | |
| 4,983,288 A | 1/1991 | Karbachsch et al. | |
| 5,061,367 A | 10/1991 | Hatch et al. | |
| 5,076,922 A | 12/1991 | DeAre | |
| 5,106,501 A | 4/1992 | Yang et al. | |
| 5,122,270 A | 6/1992 | Ruger et al. | |
| 5,202,183 A | 4/1993 | Hosako et al. | |
| 5,225,078 A | 7/1993 | Polasky et al. | |
| 5,595,659 A | 1/1997 | Huang et al. | |
| 5,609,759 A | 3/1997 | Nohren, Jr. et al. | |
| 5,674,391 A | 10/1997 | Nohren, Jr. | |
| 5,681,463 A | 10/1997 | Shimizu et al. | |
| 5,736,045 A | 4/1998 | Bies et al. | |
| 5,770,073 A * | 6/1998 | Bach | A61M 1/3627 210/472 |
| 5,897,779 A | 4/1999 | Wisted et al. | |
| 5,904,854 A | 5/1999 | Shmidt et al. | |
| 5,919,365 A | 7/1999 | Collette | |
| 5,980,743 A | 11/1999 | Bairischer | |
| 6,004,460 A | 12/1999 | Palmer et al. | |
| 6,161,710 A | 12/2000 | Dieringer et al. | |
| 6,189,436 B1 | 2/2001 | Brooks | |
| 6,193,886 B1 | 2/2001 | Nohren, Jr. | |
| 6,200,471 B1 | 3/2001 | Nohren, Jr. | |
| 6,368,506 B1 | 4/2002 | Gebert et al. | |
| 6,383,381 B1 | 5/2002 | O'Flynn et al. | |
| 6,435,209 B1 | 8/2002 | Heil | |
| 6,565,743 B1 | 5/2003 | Poirier et al. | |
| 6,569,329 B1 | 5/2003 | Nohren, Jr. | |
| 6,589,904 B1 | 7/2003 | Iwasaki et al. | |
| 6,599,427 B2 | 7/2003 | Nohren et al. | |
| 6,733,669 B1 | 5/2004 | Crick | |
| 7,473,362 B1 | 1/2009 | Nohren, Jr. | |
| 7,828,969 B2 | 11/2010 | Eaton et al. | |
| 8,051,989 B1 | 11/2011 | Tondreau | |
| 8,080,160 B2 | 12/2011 | Yanou et al. | |
| 8,133,525 B2 | 3/2012 | Skalski et al. | |
| 8,419,818 B2 | 4/2013 | Page | |
| 9,511,315 B2 | 12/2016 | Cur et al. | |
| 10,035,713 B2 | 7/2018 | Dani et al. | |
| 10,125,027 B2 | 11/2018 | Dani et al. | |
| 10,343,931 B2 | 7/2019 | Dani et al. | |
| 10,391,427 B2 | 8/2019 | Dani et al. | |
| 2001/0035094 A1 | 11/2001 | Takagaki et al. | |
| 2002/0020673 A1 | 2/2002 | Nohren et al. | |
| 2002/0060176 A1 | 5/2002 | Mierau et al. | |
| 2002/0066700 A1 | 6/2002 | Dolfel et al. | |
| 2002/0083841 A1 | 7/2002 | Chaouachi et al. | |
| 2002/0166811 A1 | 11/2002 | Walker et al. | |
| 2005/0279768 A1 | 12/2005 | Chatrath | |
| 2006/0144781 A1 | 7/2006 | Carlson et al. | |
| 2007/0007296 A1 | 1/2007 | Guyot | |
| 2007/0095758 A1 | 5/2007 | Bortun et al. | |
| 2007/0221605 A1 * | 9/2007 | Pugne | B65D 47/0838 215/235 |
| 2008/0128364 A1 | 6/2008 | Cloud et al. | |
| 2008/0274312 A1 | 11/2008 | Schelling et al. | |
| 2009/0039028 A1 | 2/2009 | Eaton et al. | |
| 2009/0139926 A1 | 6/2009 | Hassebrauck | |
| 2009/0184042 A1 | 7/2009 | Steed et al. | |
| 2010/0170839 A1 | 7/2010 | Kohl | |
| 2010/0219151 A1 | 9/2010 | Risheq | |
| 2010/0266351 A1 | 10/2010 | Vogel et al. | |
| 2010/0282682 A1 | 11/2010 | Eaton et al. | |
| 2011/0079551 A1 | 4/2011 | Olson et al. | |
| 2011/0079572 A1 | 4/2011 | Olson et al. | |
| 2011/0247975 A1 | 10/2011 | Rapparini | |
| 2011/0278216 A1 | 11/2011 | Hull et al. | |
| 2011/0303589 A1 | 12/2011 | Kuennen et al. | |
| 2011/0305801 A1 | 12/2011 | Beer | |
| 2012/0017768 A1 | 1/2012 | Anson et al. | |
| 2012/0055862 A1 | 3/2012 | Parekh et al. | |
| 2012/0061312 A1 | 3/2012 | Busick et al. | |
| 2012/0187036 A1 | 7/2012 | Risheq | |
| 2012/0193282 A1 | 8/2012 | Wolf et al. | |
| 2012/0214375 A1 | 8/2012 | Kitano et al. | |
| 2012/0255890 A1 | 10/2012 | Cumberland | |
| 2012/0267314 A1 | 10/2012 | Minton-Edison et al. | |
| 2012/0292247 A1 | 11/2012 | Moon et al. | |
| 2012/0298570 A1 | 11/2012 | Osawa et al. | |
| 2012/0298614 A1 | 11/2012 | Nelson | |
| 2012/0325735 A1 | 12/2012 | Dicks et al. | |
| 2013/0037481 A1 | 2/2013 | Lalouch et al. | |
| 2013/0045252 A1 | 2/2013 | Rawlings et al. | |
| 2013/0095212 A1 | 4/2013 | Beer | |
| 2013/0125748 A1 | 5/2013 | Taylor et al. | |
| 2013/0156897 A1 | 6/2013 | Goldstein | |
| 2013/0175228 A1 | 7/2013 | Utsch et al. | |
| 2013/0199989 A1 | 8/2013 | Carter et al. | |
| 2013/0233890 A1 | 9/2013 | Melzer | |
| 2013/0319927 A1 | 12/2013 | Lin | |
| 2014/0014566 A1 | 1/2014 | Mitchell | |
| 2014/0151285 A1 | 6/2014 | Cur et al. | |
| 2015/0166364 A1 | 6/2015 | Wiegele | |
| 2016/0167980 A1 | 6/2016 | Dani et al. | |
| 2016/0376161 A1 | 12/2016 | Dani et al. | |
| 2016/0376162 A1 | 12/2016 | Dani et al. | |
| 2016/0376163 A1 | 12/2016 | Dani et al. | |
| 2016/0376164 A1 | 12/2016 | Dani et al. | |
| 2016/0376165 A1 | 12/2016 | Dani et al. | |
| 2017/0001880 A1 | 1/2017 | Dani et al. | |
| 2018/0250615 A1 | 9/2018 | Dani et al. | |
| 2018/0264222 A1 * | 9/2018 | Dantanarayana | A61M 16/208 |
| 2018/0264382 A1 | 9/2018 | Dani et al. | |
| 2018/0265374 A1 | 9/2018 | Dani et al. | |
| 2018/0311600 A1 | 11/2018 | Dani et al. | |

FOREIGN PATENT DOCUMENTS

| | | |
|---|---|---|
| CA | 2874153 A1 | 6/2015 |
| CA | 2933185 A1 | 6/2015 |
| EP | 0402661 A1 | 12/1990 |
| EP | 0617951 A2 | 10/1994 |
| GB | 2268680 A | 1/1994 |
| GB | 2280596 A | 2/1995 |
| JP | 04-126585 | 4/1992 |
| JP | 657489 U | 8/1994 |
| WO | 9835738 A1 | 8/1998 |
| WO | 0071468 A1 | 11/2000 |
| WO | 2011145640 A1 | 11/2011 |
| WO | 2012031853 A1 | 3/2012 |
| WO | 2012150506 A2 | 11/2012 |
| WO | 2013044079 A1 | 3/2013 |
| WO | 2013088260 A1 | 6/2013 |
| WO | 2014089207 A1 | 6/2014 |
| WO | 2015073144 A1 | 5/2015 |
| WO | 2015094741 A1 | 6/2015 |
| WO | 2017055914 A1 | 4/2017 |
| WO | 2017055916 A1 | 4/2017 |
| WO | 2017055918 A1 | 4/2017 |
| WO | 2017056915 A1 | 4/2017 |

OTHER PUBLICATIONS

Australian Office Action dated Dec. 20, 2018 in corresponding/related Australian Application No. 2014366927.
Australian Office Action dated Feb. 22, 2018 in corresponding/related Australian Application No. 2014366927.
Australian Office Action dated Jun. 22, 2018 in corresponding/related Australian Application No. 2014366926.
Australian Office Action dated Mar. 8, 2018 in corresponding/related Australian Application No. 2014366937.

(56) References Cited

OTHER PUBLICATIONS

Australian Office Action dated May 25, 2018 in corresponding/related Australian Application No. 2014366492.
CamelBak: "CamelBak Relay Water Pitcher," published Jan. 22, 2014, p. 1, XP054977371. Retrieved from Internet: URL: https://www.youtube.com/watch?v=01TdZCF8AqY [retrieved on May 18, 2017].
Hutton, I.M. 2007, Handbook of Nonwoven Filter Media (1st ed.), pp. 96-99.
International Preliminary Report on Patentability dated Apr. 3, 2018 in corresponding/related International Application No. PCT/IB2016/001472.
International Preliminary Report on Patentability dated Apr. 3, 2018 in corresponding/related International Application No. PCT/IB2016/001474.
International Preliminary Report on Patentability dated Apr. 3, 2018 in corresponding/related International Application No. PCT/IB2016/001479.
International Preliminary Report on Patentability dated Apr. 3, 2018 in corresponding/related International Application No. PCT/IB2016/001495.
International Search Report and Written Opinion dated Feb. 6, 2017 in corresponding/related International Application No. PCT/IB2016/001472.
International Search Report and Written Opinion dated Jan. 26, 2017 in corresponding/related International Application No. PCT/IB2016/001474.
International Search Report and Written Opinion dated Jan. 27, 2017 in corresponding/related International Application No. PCT/IB2016/001479.
International Search Report and Written Opinion dated Jan. 27, 2017 in corresponding/related International Application No. PCT/IB2016/001495.
NPL-1 ( "Activated Carbon Filter Bags", Filterek) Date: Jun. 4, 2012.
Office Action dated Mar. 4, 2019 in corresponding/related Australian Application No. 2014366937.
Oxford Dictionary Definition—coextensive, 2017, 1 page.
Oxford Dictionary Definition—immediately, 2017, 1 page.
Supplementary European Search Report EP 14870910.8, dated Jun. 8, 2017.
Supplementary European Search Report EP 14871227.6, dated Jun. 8, 2017.
Supplementary European Search Report EP 14871467.8, dated Jun. 8, 2017.
Supplementary European Search Report EP 14871701.0 dated Jun. 8, 2017.
Supplementary European Search Report EP 14871914.9, dated Jun. 13, 2017.
Supplementary European Search Report EP 14872175.6, dated Jun. 8, 2017.
U.S. Appl. No. 14/569,397, U.S. Pat. No. 10,035,713, Dec. 12, 2014, Dani et al.
U.S. Appl. No. 15/038,982, U.S. Pat. No. 10,125,027, May 24, 2016, Dani et al.
U.S. Appl. No. 15/039,002, U.S. Pat. No. 10,351,442, May 24, 2016, Dani et al.
U.S. Appl. No. 15/756,768, U.S. Pat. No. 10,343,931, Mar. 1, 2018, Dani et al.
U.S. Appl. No. 15/756,809, U.S. Pat. No. 10,391,427, Mar. 1, 2018, Dani et al.
U.S. Appl. No. 15/984,113, 2018/0265374, May 18, 2018, Dani et al.
U.S. Appl. No. 15/039,012, 2016/0376165, May 24, 2016, Dani et al.
U.S. Appl. No. 14/132,134, 2015/0166364, Dec. 18, 2013, Wiegele.
U.S. Appl. No. 15/038,996, 2016/0376161, May 24, 2016, Dani et al.
U.S. Appl. No. 15/038,998, 2016/0376162, May 24, 2016, Dani et al.
U.S. Appl. No. 15/039,008, 2016/0376164, May 24, 2016, Dani et al.
U.S. Appl. No. 15/756,713, 2018/0311600, Mar. 1, 2018, Dani et al.
U.S. Appl. No. 15/756,747, 2018/0250615, Mar. 1, 2018, Dani et al.
U.S. Appl. No. 16/250,316, filed Jan. 17, 2019, Wiegele.
U.S. Appl. No. 16/503,100, filed Jul. 3, 2019, Dani et al.

* cited by examiner

FILTER DESIGN WITH INTERCHANGEABLE CORE COVER

CROSS-REFERENCE TO RELATED APPLICATIONS

This application is a continuation of U.S. application Ser. No. 15/756,768 filed on Mar. 1, 2018, now U.S. Pat. No. 10,391,427, which claims the benefit and priority of International Application No. PCT/IB2016/001479, filed on Sep. 27, 2016, which claims the benefit of U.S. Provisional Application No. 62/235,304, filed on Sep. 30, 2015. This application is also related to the following United States patent applications: (1.) U.S. application Ser. No. 15/756,713 filed on Mar. 1, 2018, which claims the benefit and priority of International Application No. PCT/IB2016/001472, filed on Sep. 27, 2016, which claims the benefit of U.S. Provisional Application No. 62/235,289, filed on Sep. 30, 2015; (2.) U.S. application Ser. No. 15/756,747 filed on Mar. 1, 2018, now U.S. Pat. No. 10,765,973, which claims the benefit and priority of International Application No. PCT/IB2016/001495, filed on Sep. 27, 2016, which claims the benefit of U.S. Provisional Application No. 62/235,295, filed on Sep. 30, 2015; and (3.) U.S. application Ser. No. 15/756,809 filed on Mar. 1, 2018, now U.S. Pat. No. 10,343,931, which claims the benefit and priority of International Application No. PCT/IB2016/001474 filed on Sep. 27, 2016, which claims the benefit of U.S. Provisional Application No. 62/235,321 filed on Sep. 30, 2015. The entire disclosures of each of the above applications are incorporated herein by reference.

FIELD

Embodiments of the present invention generally concern water filtration systems for pitchers and other fluid containers. More particularly, embodiments of the invention relate to an interchangeable core cover configured to be used with a filter core of a filter assembly.

BACKGROUND

This section provides background information related to the present disclosure which is not necessarily prior art.

Water filtration has become common in homes, offices and other places to produce cleaner and better tasting water. Accordingly, water containers such as pitchers have been equipped with filtration systems. In some instances, these filtration systems may employ a filter core around which a piece of a filter medium is wrapped and secured. The filter core can include various openings that allow unfiltered water to enter the interior of the filter core by passing through the filter medium. The filtered water can then exit through an open end of the filter core.

Although filter assemblies such as that just described have proven useful in some circumstances, certain problems nonetheless remain. For example, the filter core is typically configured with an outlet of fixed diameter that is sized for a particular flow rate, or range of flow rates, based upon the filter medium, or filter media, employed in the associated filter assembly. This can be problematic from a variety of perspectives.

For example, a manufacturer would be required to produce an array of different filter cores, each having a particular outlet diameter matched to the particular filter medium, or media, expected to be used with that filter core. This is an inefficient approach to manufacturing inasmuch as it would require tool and/or process changes to manufacture filter cores having different outlet sizes.

A related concern is that careful attention must be paid during the manufacturing process to ensure that a filter core of the appropriate outlet diameter is correctly matched to the filter medium or filter media that is to be used with that filter core. For example, a filter core with relatively small outlet diameter, and a correspondingly low flow rate, may not provide a satisfactory consumer experience. As another example, a filter core with relatively large outlet diameter, and a correspondingly high flow rate, may not enable adequate contact time between the fluid and the filtration medium/media, thus limiting the effectiveness of the filter assembly.

Further, a filter core configuration with a fixed diameter can be problematic for the consumer as well. For example, even if the consumer is willing to exchange a degree of filtration effectiveness for a relatively higher flow rate, the fixed diameter of the filter core may prevent such a tradeoff, resulting in dissatisfaction on the part of the consumer. Likewise, even if the consumer is willing to accept a reduced flow rate in exchange for a relative improvement in filtration performance, the fixed diameter of the filter core may prevent such a tradeoff, again resulting in dissatisfaction on the part of the consumer.

In light of problems such as those noted above, it would be useful to provide a filter core that is not limited to a fixed flow rate, or range of flow rates. As well, it would useful to provide a filter core having a flow rate, or range of flow rates, that corresponds to the type of filter medium/media with which the filter core is employed. Finally, it would be useful to provide a filter core that can be readily configured to provide any one of a number of desired flow rates.

SUMMARY

One or more embodiments within the scope of the invention may be effective in overcoming one or more of the disadvantages in the art. One example embodiment is directed to a core cover configured to pass a particular flow rate or range of flow rates when employed in a filter assembly. As such, the core cover implements a flow regulation function, among others.

Core covers according to embodiments of the invention can each be configured to pass a particular flow rate or range of flow rates. Notwithstanding any differences in the respective flow rates they are configured to pass however, each of the core covers has a common interface configuration that enables them to be used interchangeably in the same filter core, or filter cores of the same configuration. Thus, the flow rate associated with a particular filter core can be easily customized, such as during manufacturing for example, by simply selecting a core cover with the desired flow rate. The core cover can be simple in construction and may, in some cases, take the form of a unitary, single-piece structure.

In at least some embodiments, the core cover remains permanently engaged with the filter core once installed in the filter core. In other embodiments, the core cover is releasably engageable with the filter core such that an existing core cover in a filter core can be removed and replaced with another filter core.

The core cover can include indicia that are perceptible by the senses of a user. The indicia may directly indicate or reference, for example, any one or more of the flow rate or range of flow rates the core cover is configured to pass, and/or the type(s) of filter medium/media for which the core cover is suited. As well, the indicia can take any form perceptible by one or more senses of a user, examples of which include colors, numbers, letters, shapes, and symbols. Thus, some indicia, such as raised letters or numbers for example, can be both seen and felt by a user, while other indicia, such as color for example, are only visually perceptible. In any case, the scope of the invention is not limited to the use of any particular indicator or indicia however.

Finally, some embodiments of the core cover can be used in connection with a filter assembly including a filter core about which a filter medium is wrapped two or more times. In one particular embodiment, the filter medium is a laminate that includes a layer of activated carbon fiber (ACF) media positioned between two layers of non-woven material. Still other embodiments of the core cover are used in connection with a filter assembly including a filter core or filter cartridge that contains a filter medium such as ion exchange resin (IER) which may be combined in some cases with activated carbon granules.

The foregoing examples are provided solely by way of example and is not intended to limit the scope of the invention in any way. Consistently, various other embodiments of filter assemblies, and associated filter media and core covers, within the scope of the invention are disclosed herein.

DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION

Reference will now be made in detail to aspects of various embodiments of the present disclosure, examples of which are illustrated in the accompanying drawings. While described in conjunction with these embodiments, it will be understood that they are not intended to limit the disclosure to these embodiments.

In general, embodiments of the invention can be employed in connection with devices, such as filter assemblies and fluid containers, where there is a need to filter fluid as, and/or before, the fluid is dispensed from the container. In one particular example, embodiments of the invention can be used in conjunction with a pitcher, although the scope of the invention is not limited to this example environment and extends, more generally, to any environment where such embodiments can be usefully employed. For example, embodiments of the invention can be employed with any water, or other fluid, container, examples of which include, but are not limited to, bottles, carafes, and jugs.

A. Example Filter Assembly

Figure 1:
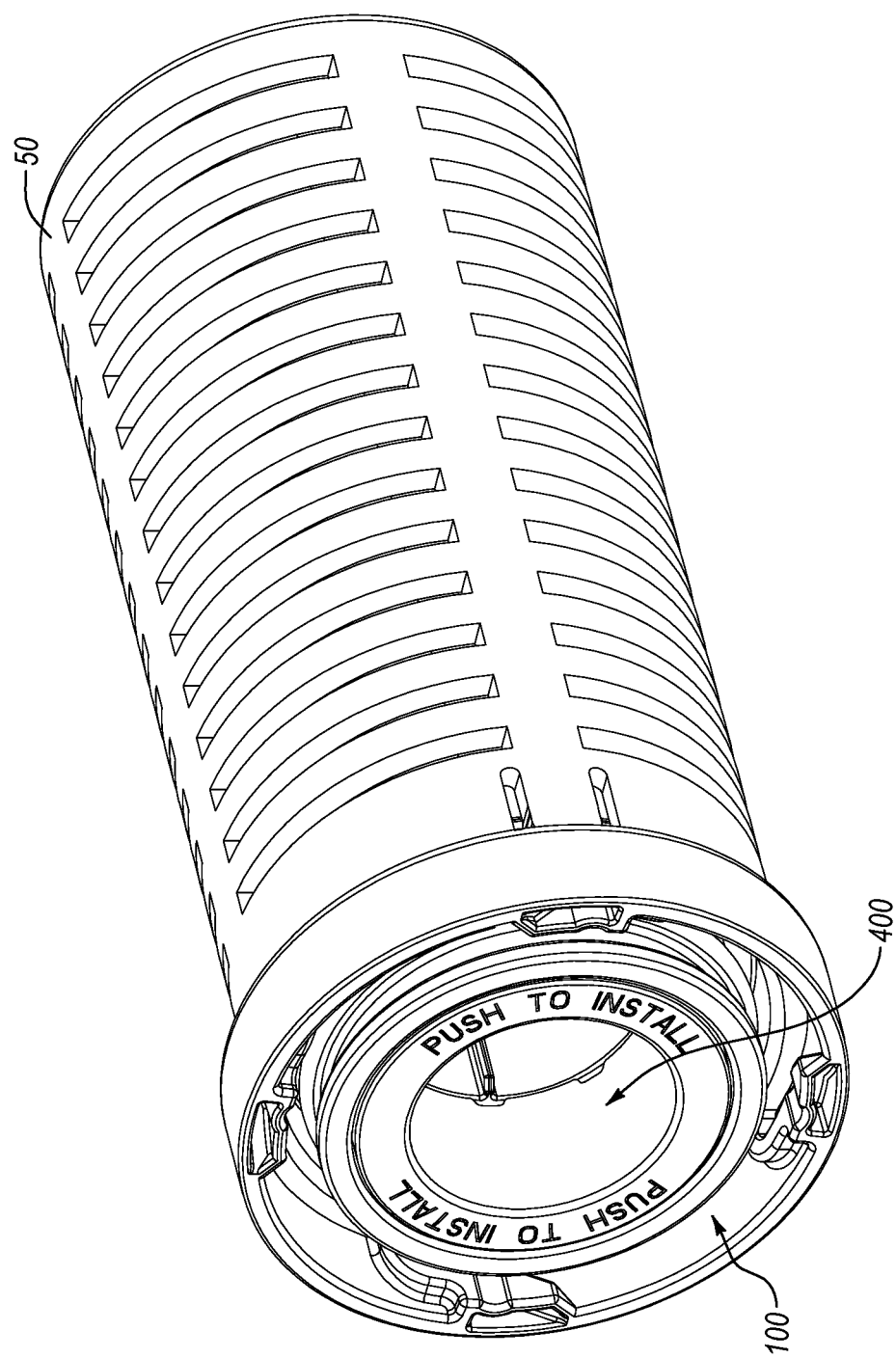
FIG. 1 is a top perspective view of an example embodiment of a filter assembly and associated cage.
Figure 2:
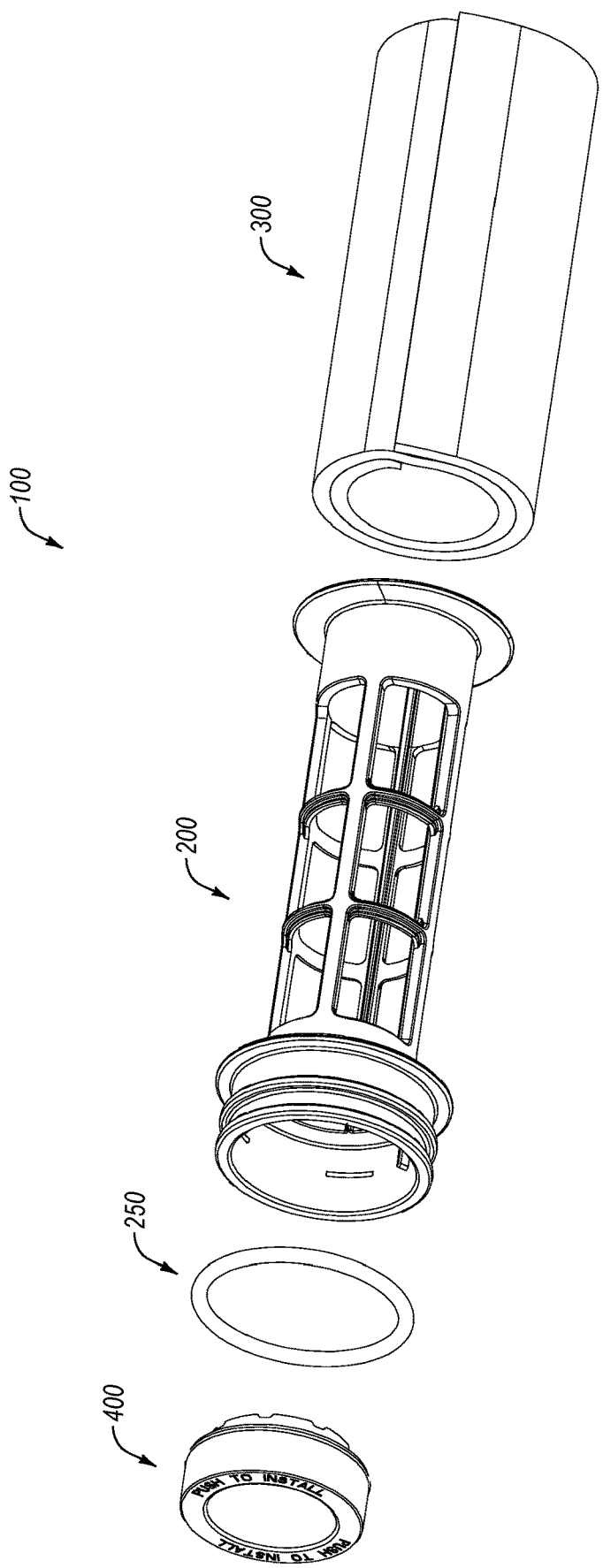
FIG. 2 is an exploded view of the example filter assembly of FIG. 1.

Directing attention now to FIGS. 1 and 2, details are provided concerning a filter assembly, one example of which is denoted generally at 100. Embodiments of the filter assembly 100 can be employed in connection with a cage 50 that may be a removable element of a fluid container, such as the example fluid containers disclosed herein. In general, the filter assembly 100 can be releasably engaged with the cage 50, and the cage 50 then connected to the fluid container. In the particular example of FIGS. 1 and 2, the filter assembly 100 can be configured to releasably engage the cage 50 in a push fit or snap fit arrangement. As such, the filter assembly 100 can include structures (not shown) that can be releasably engaged with corresponding structure(s) (not shown) of the cage 50 by pushing the filter assembly 100 into the cage 50 until the filter assembly 100 snaps or locks into the cage 50. Likewise, the filter assembly 100 can be removed from the cage 50 by pushing the filter assembly 100 at a location near the bottom of the cage 50. The scope of the invention is not limited to the foregoing example however, and any other structure(s) that enable releasable engagement of the cage 50 and the filter assembly 100 with each other can be used.

Figure 3:
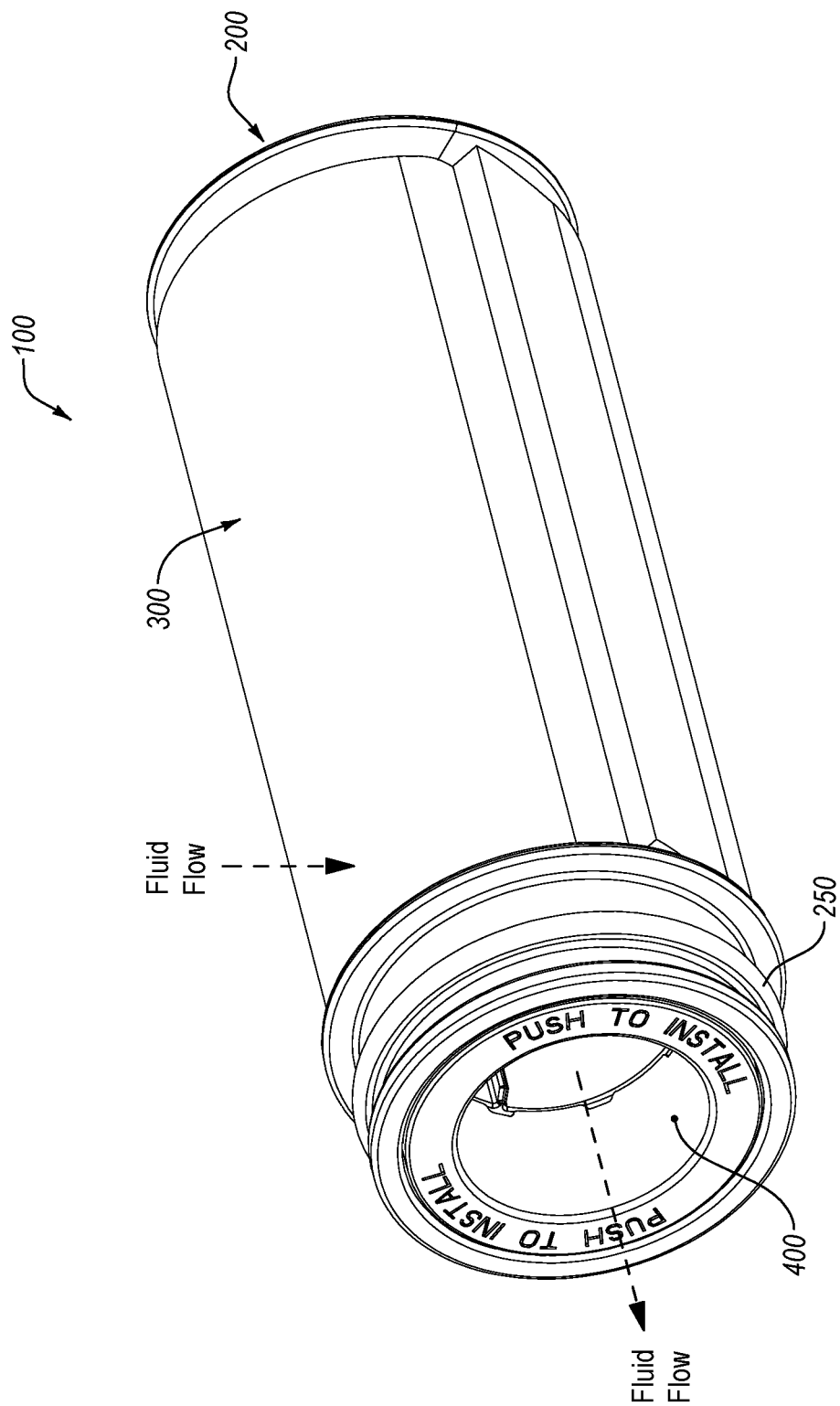
FIG. 3 is a top perspective view of an example embodiment of a filter assembly and associated core cover.

As best shown in FIG. 2, the example filter assembly 100 includes a filter core 200 that may include one or more sealing elements 250, such as an O-ring for example, that seals the filter core 200 to the fluid container (not shown) when the filter core 200 and fluid container are engaged with each other, so as to prevent bypass of unfiltered fluid past the filter core 200 and out of the fluid container. In the example of FIG. 3, the filter assembly 100 further includes a filter medium 300 attached to the filter core 200. In particular, the filter medium 300 can be wrapped around the filter core 200 to form multiple stacked layers, as shown in FIGS. 2, 3, and 5 discussed below. Some examples of a filter medium 300 that can be used in connection with embodiments of the filter core 200 are disclosed in United States Publication No. 2018-0311600, and identified in the 'Related Applications' section of this disclosure. The scope of the invention is not limited to the use of such a filter medium however.

With continued reference to FIGS. 1 and 3, the filter assembly 100 further includes a core cover 400. In general, the core cover 400 can define a flow control opening 402 that enables control of the flow rate of fluid out of the filter assembly 100. The core cover 400 can be removably attached to the filter core 200 in any suitable way, such as with threads, a snap-fit arrangement, or any other type of respective complementary structures. Some example complementary structures of a filter core and core cover are disclosed in the aforementioned 'Related Application.'

Figure 4:
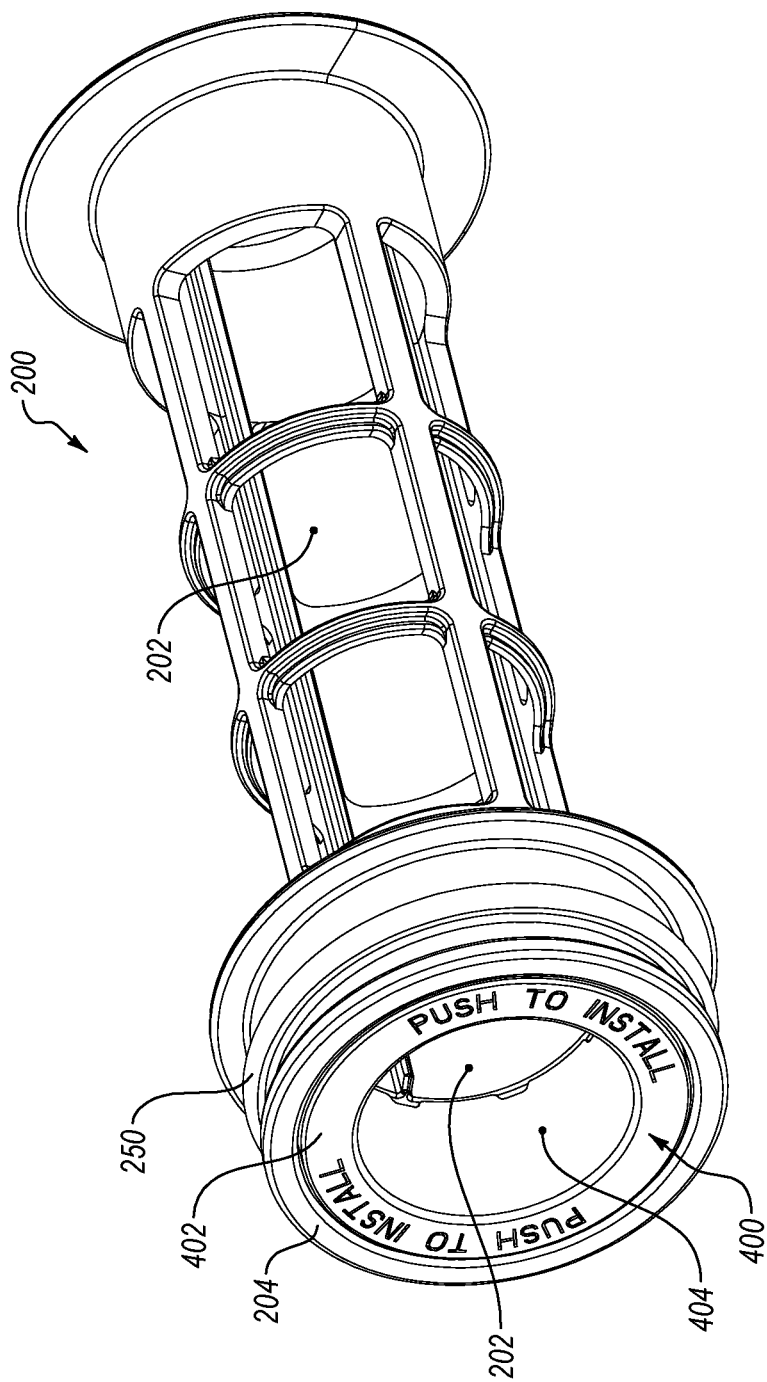
FIG. 4 is a top perspective view of an example filter core including a core cover.

With particular attention now to FIGS. 3 and 4, and continuing attention to FIG. 2, the example filter assembly 100 is disclosed with the cage 50 omitted. FIGS. 2 and 3 indicate that the filter medium 300 is wrapped multiple times around the filter core 200. Thus, in order to enter the filter core 200, such as during a fluid dispensing process for example, the fluid to be filtered must pass through the layers of the filter medium 300. In more detail, and with reference to FIGS. 3 and 4, fluid passing through the filter medium 300 from a location external to the filter assembly 100 enters the hollow interior 202 and can then exit the filter core 200 by way of the core cover 400.

B. Example Core Cover

With continued attention to FIG. 4, and directing attention now to FIGS. 5a-8, details are provided concerning example embodiments of a core cover, one example of which is denoted at 400. In general, the core cover 400 can be made of any suitable material, or materials. Example embodiments of the core cover 400 are made of chemically inert materials. In at least some embodiments, the core cover 400 is substantially, or completely, made of plastic. Moreover, the core cover 400 may have a unitary, single-piece construction. As well, the core cover 400 can be constructed using any suitable production process(es), one example of which is injection molding.

As shown in FIG. 4, the core cover 400 can be configured such that when the core cover 400 is fully received by the filter core 200, the upper surface 402 of the core cover 400 is substantially flush with the end surface 204 of the filter core 200. In the illustrated example, the core cover 400 and corresponding receiving structure of the filter core 200 are indicated as generally circular in shape. However, other shapes can be employed and the scope of the invention is not limited to the illustrated example.

With continued reference to FIG. 4, the core cover 400 defines a fluid passageway 404 that is arranged for fluid communication with the interior 202 of the filter core 200 when the core cover 400 is positioned as indicated. Further details concerning the fluid passageway 404 can be found in the discussion of the remaining figures below.

Figure 5A:
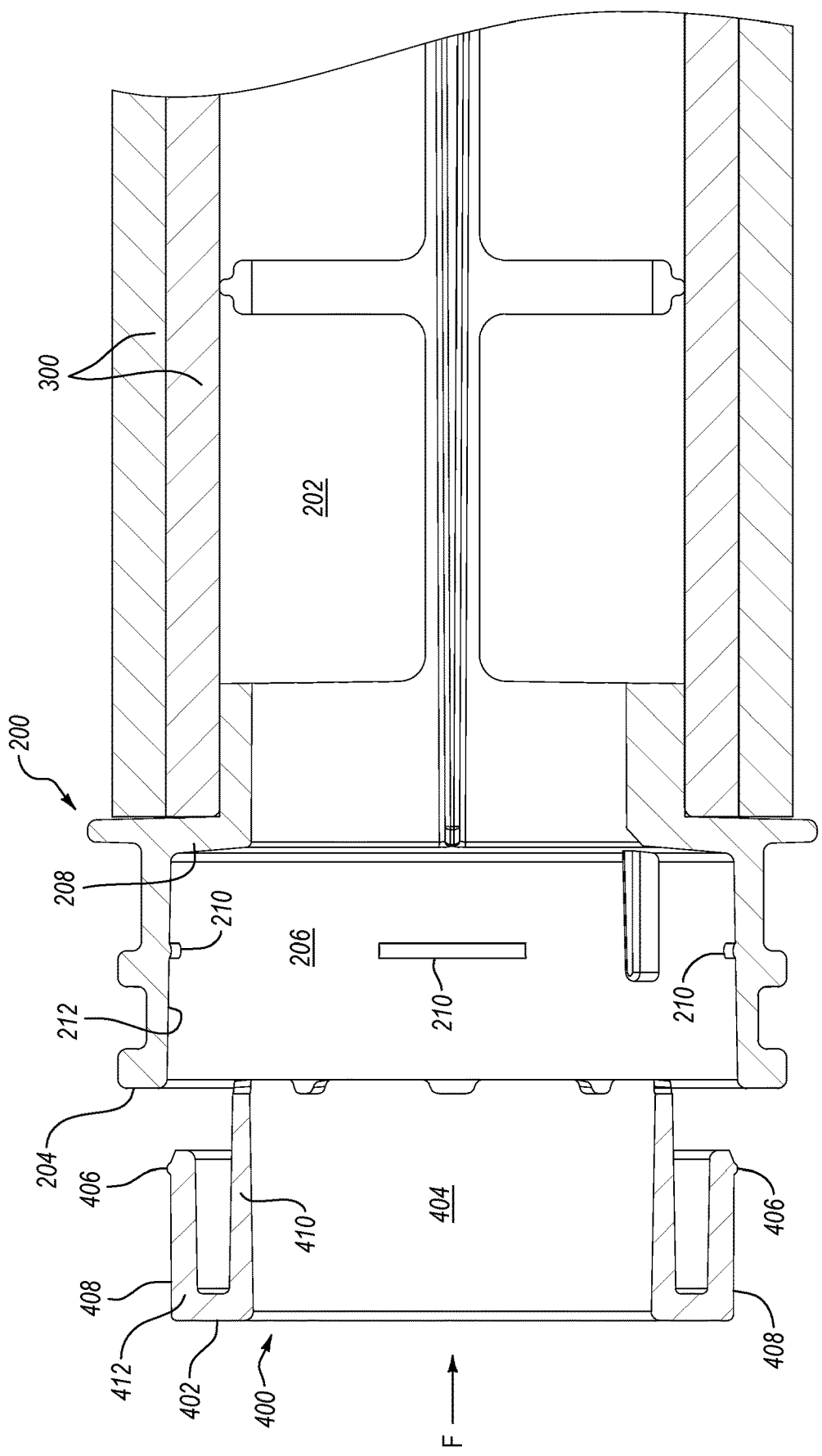
FIGS. 5a and 5b are section views of an example filter core and core cover.
Figure 5B:
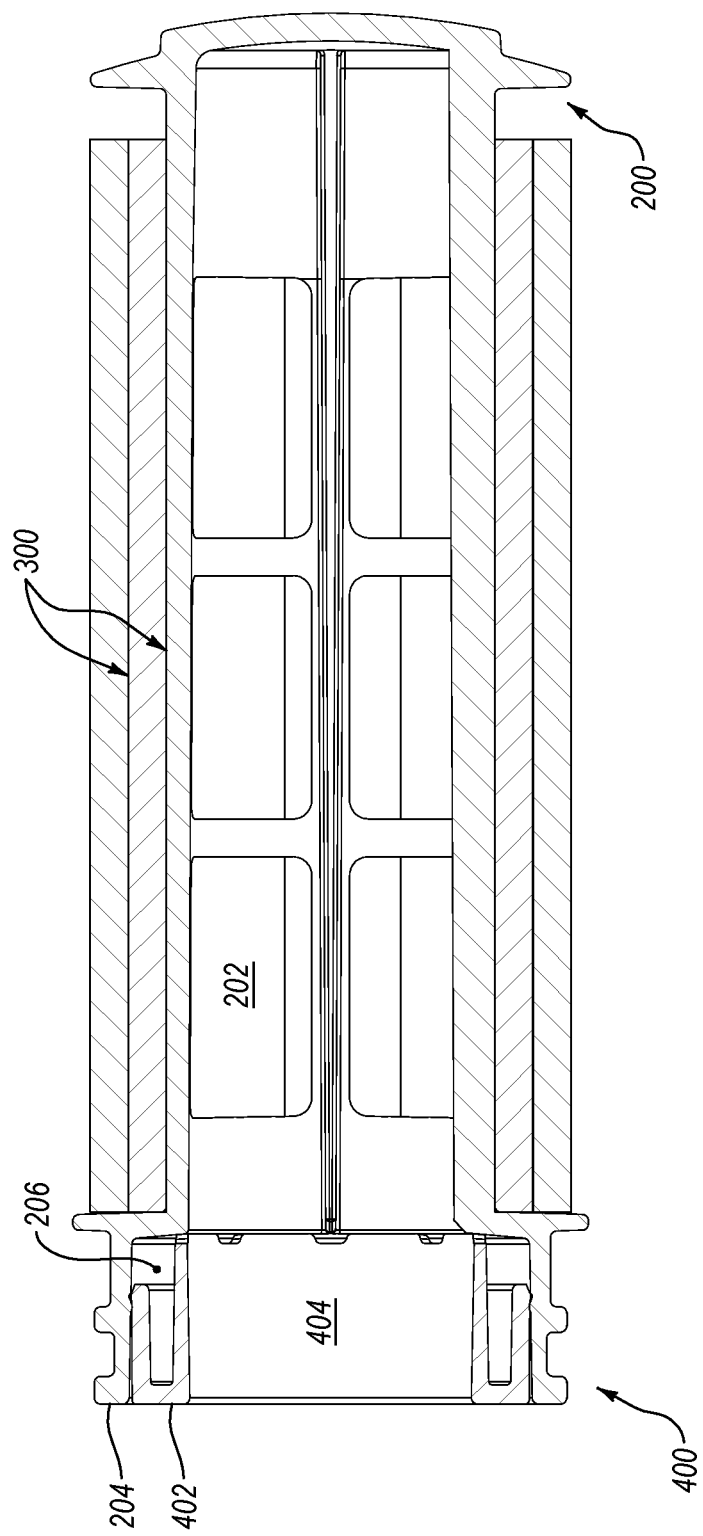

Directing attention now to FIGS. 5a and 5b, details are provided concerning some aspects of an example interface between the core cover 400 and the filter core 200. In the illustrated example, the filter core 200 defines a recess 206 sized and configured to receive the core cover 400. In general, the recess 206 is axially aligned with the fluid passageway 404 of the core cover 400 when the core cover 400 is received in the recess 206, and the recess 206 is in fluid communication with the interior 202 of the filter core 200. The depth of the recess 206, which can generally correspond to the overall height of the core cover 400, is defined by an annular shoulder 208. Among other things, the annular shoulder 208 can serve to limit the depth to which the core cover 400 is inserted into the recess 206. Any other structure(s) of comparable functionality could alternatively be employed however.

As further indicated in FIG. 5a in particular, the filter core 200 can include one or more complementary structures 210 configured to engage, either permanently or releasably, one or more corresponding complementary structures 406 of the core cover 400. In the particular embodiment illustrated in FIG. 5a, the complementary structures 210 comprise a plurality of elongate protrusions disposed about a perimeter of the recess 206. The example of FIG. 5b includes four protrusions, but any suitable number of protrusions, such as one, two, three or any number more than four, could be employed. In general, the protrusions extend radially into the recess 206 so as to be positioned to engage the complementary structures 406 of the core cover 400 as the core cover 400 is moved into position in the recess 206.

In particular, the complementary structure 406 can take the form of an annular ring disposed about the exterior of the core cover 400 and extending outwardly in a radial direction from the core cover 400 side surface 408. When in the form of an annular ring at least, the complementary structure 406 is configured and arranged to slip past the complementary structure(s) 210, which may be in the form of protrusions as discussed above, as the core cover 400 is inserted into the recess 206.

In their undeformed dispositions, the complementary structures 210 and 406 may collectively form an interference fit. For example, the outside diameter of the complementary structure 406, when in the form of an annular ring for example, may be relatively larger than the inside diameter of the complementary structure 210, when in the form of protrusions for example. As such, the core cover 400 cannot be fully inserted into the recess 206 unless the core cover 400 is deformed to some degree. Accordingly, at least some embodiments of the core cover 400 are configured to elastically deform to the extent necessary to enable full insertion of the core cover 400 into the recess 206.

In at least some embodiments, this functionality is achieved by way of a cantilever configuration defined by the inner wall 410 and outer wall 412 of the core cover 400. In particular, because the bottom end of the outer wall 412 is unconstrained, it is movable to some extent in a radial direction. Correspondingly, the radial position of the complementary structure 406, which is positioned on the outer wall 412, can be changed, such as when the core cover 400 is inserted into the recess 206. Thus, an insertion force F (see FIG. 5a) exerted on the core cover 400 temporarily overcomes the interference between the complementary structures 406 and 210 by causing an elastic deformation of the outer wall 412 as the complementary structure 406 encounters the complementary structure 210 of the filter core 200. After the complementary structure 406 is positioned below the complementary structure 210, the outer wall 412 reassumes its undeformed state where the free end of the outer wall 412 is undeflected, thus locking the core cover 400 into the recess 206, as shown in FIG. 5b.

If there is a need to ensure that the core cover 400 remains permanently in the recess 206, one or both of the complementary structures 210 and 406 can be modified to increase the extent to which those structures interfere with each other. On the other hand, if there is a need to be able to remove the core cover 400 from the recess 206, the interference fit between the complementary structures 210 and 406 can be implemented accordingly.

While the example of FIGS. 5a and 5b utilizes an interference fit to ensure retention, either permanent or removable, of the core cover 400 in the filter core 200, various other complementary structures can be employed to engage the core cover 400 and filter core 200, whether permanently or releasably. As an example of the latter, the core cover outer wall 412 can include threads (not shown) that engage corresponding threads (not shown) of the wall 212 that defines the recess 206. Thus, a core cover 400 configured in this way can be easily installed, removed, and replaced in a filter core 200.

It will be appreciated from the foregoing discussion that the complementary structures disclosed herein are but a few examples of structural implementations of a means for engaging, permanently or releasably depending on the embodiment, the core cover 400 and the filter core 200. Accordingly, any other structure(s) of comparable functionality could alternatively be employed.

Figure 6:
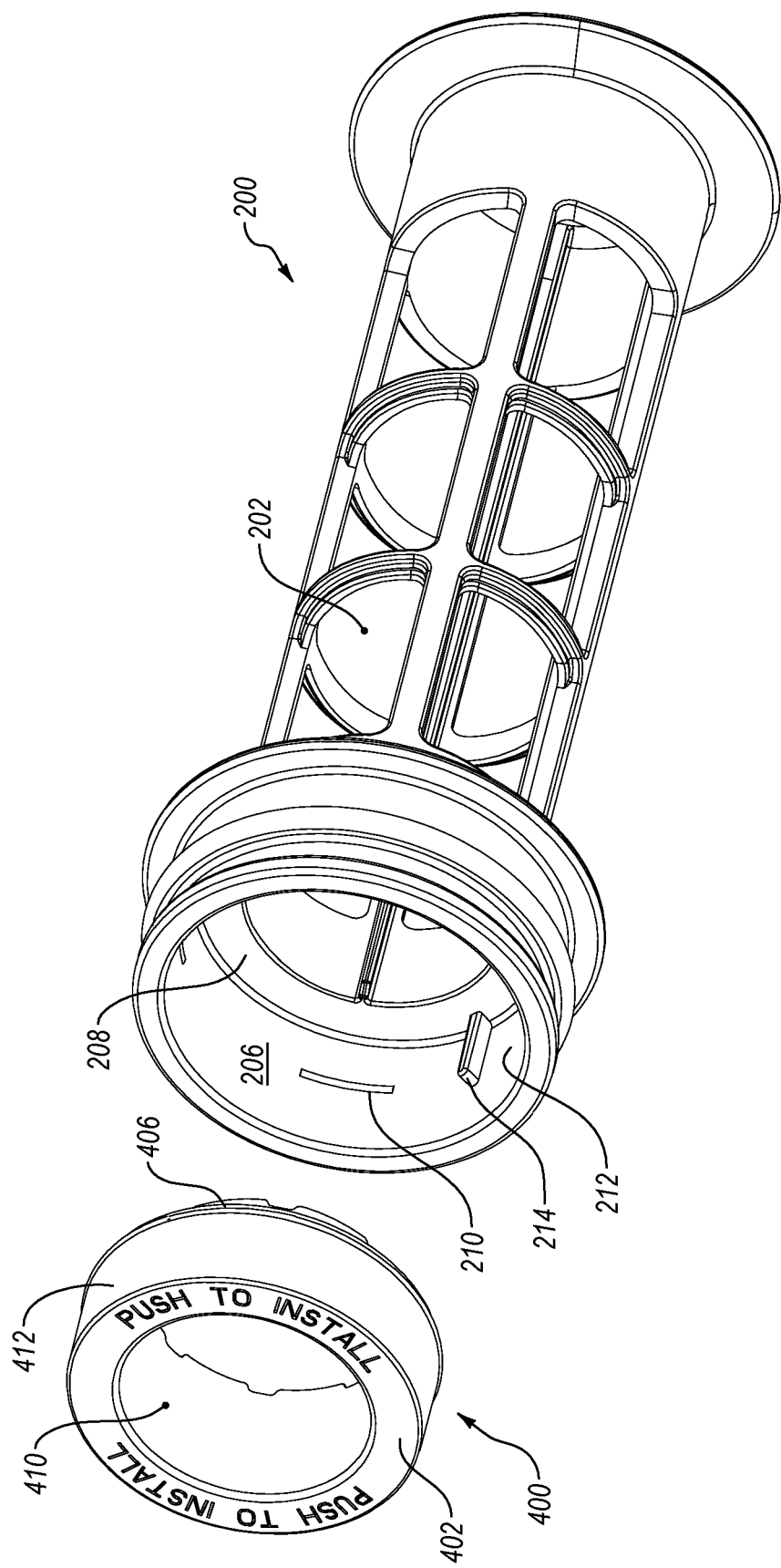
FIG. 6 is an exploded view of an example filter core and core cover.
Figure 7:
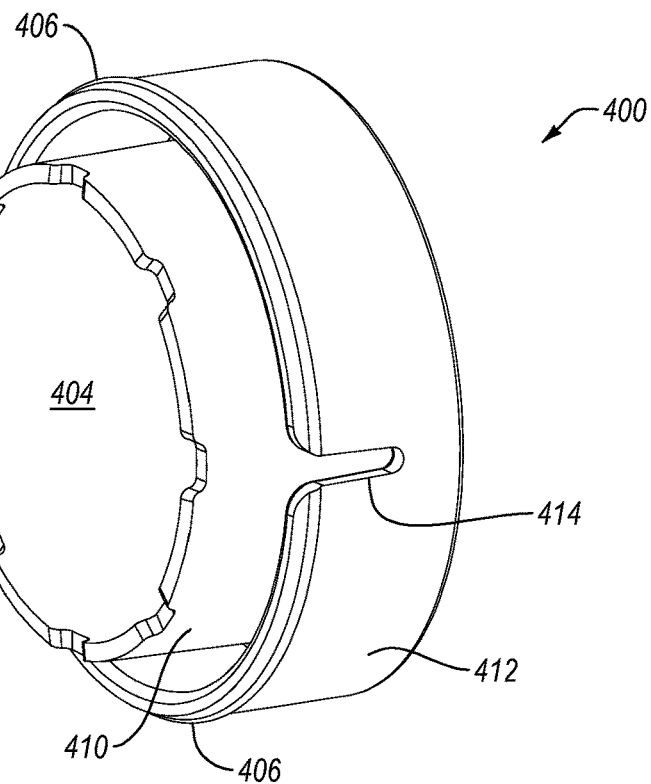
FIG. 7 is a bottom perspective view of an example core cover.
Figure 8:
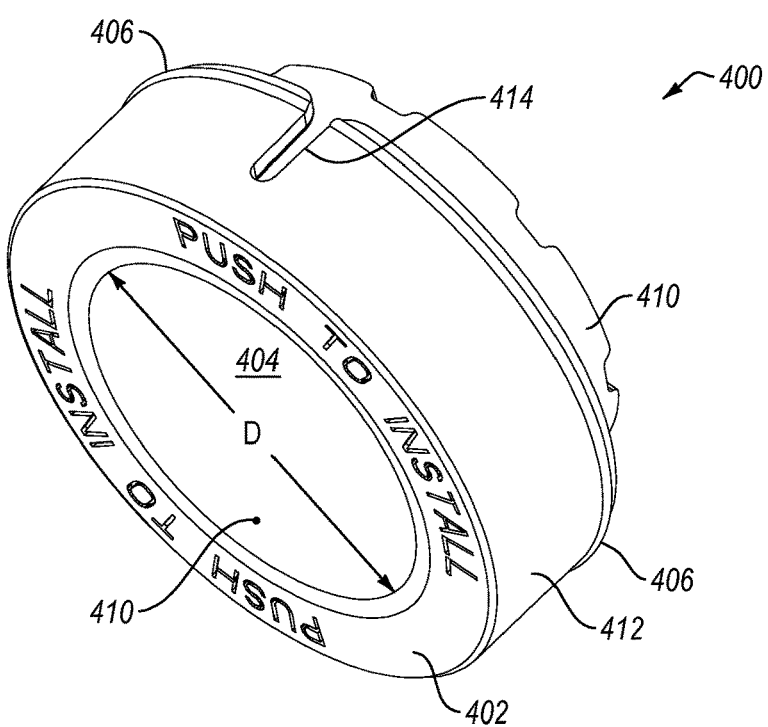
FIG. 8 is a top perspective view of an example core cover.

With reference now to FIGS. 6-8, additional details are provided concerning the structure and operation of example embodiments of the core cover 400. As shown, embodiments of the core cover 400 may include additional structures that engage corresponding structures of the filter core 200. For example, the core cover 400 may include one or more index slots 414 that releasably engage a corresponding index guide 214, or index guides 214 as applicable, of the filter core 200. In the illustrated example, the index guide 214 takes the form of an axially oriented protrusion extending from the wall 212 of the filter core 200. The index slot 414 and index guide 214 can be used to orient the core cover 400 in a particular way relative to the filter core 200 by inserting the core cover 400 in the filter core 200 so that the index guide 214 is received in the index slot 414. The index guide 214 and index slot 414 can also cooperate with each other to prevent axial rotation of the core cover 400 in the recess 206.

C. Flow Control

With continued reference to FIGS. 7 and 8 in particular, the fluid passageway 404 of the core cover 400 is an example structural implementation of a means for flow control. Any other structure(s) of comparable functionality can alternatively be employed however. In general, the diameter D of the fluid passageway 404 can be selected as desired to enable a particular flow rate, or range of flow rates, through the fluid passageway 404. This notion is embodied in the equation: $Q = V \times A$, where Q is the desired flow rate, V is the velocity of the flow, and A is the area of the fluid passageway 404. The area A is a function of the diameter D, thus: $A = \pi \times D^2 / 4$. In embodiments where the fluid passageway 404 is non-circular, the area A can be readily obtained by other suitable equations, and then selected as necessary to obtain a desired flow rate or range of flow rates.

While the example fluid passageway 404 is indicated in the figures as being generally cylindrical in shape, and thus having a relatively constant diameter, the scope of the invention is not so limited. Thus, for example, the fluid passageway 404 can have a conical type of configuration in which the diameter increases, or decreases, from the first end of the fluid passageway 404 to the second end of the fluid passageway 404.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A core cover, comprising:
    an annular end face;
    an annular inner wall having a first inner end and a second inner end, the first inner end coupled to the annular end face and the second inner end cantilevered from the annular end face; and
    an annular outer wall having a first outer end and a second outer end, the first outer end coupled to the annular end face and the second outer end cantilevered from the annular end face;
    wherein the core cover is configured to be engaged with a filter core to define a fluid passageway to communicate with an interior of the filter core.

2. The core cover of claim 1, wherein the core cover is a unitary, single-piece construction.

3. The core cover of claim 1, further comprising indicia to indicate a flow rate or range of flow rates associated with the core cover.

4. The core cover of claim 1, further comprising a complementary structure configured to engage a corresponding complementary structure of the filter core to attach the core cover to the filter core.

5. The core cover of claim 4, wherein the complementary structure is an annular ring radially extending from the outer wall.

6. The core cover of claim 1, wherein the outer wall is configured to flex in a radial direction upon engaging the core cover with the filter core.

* * * * *